US008198565B2

(12) United States Patent
Lu et al.

(10) Patent No.: US 8,198,565 B2
(45) Date of Patent: Jun. 12, 2012

(54) LASER-WELDING APPARATUS AND METHOD

(75) Inventors: Feng Lu, Farmington Hills, MI (US); Mariana G. Forrest, Troy, MI (US)

(73) Assignee: Chrysler Group LLC, Auburn Hills, MI (US)

( * ) Notice: Subject to any disclaimer, the term of this patent is extended or adjusted under 35 U.S.C. 154(b) by 1097 days.

(21) Appl. No.: 12/101,546

(22) Filed: Apr. 11, 2008

(65) Prior Publication Data

US 2008/0251504 A1 Oct. 16, 2008

Related U.S. Application Data

(60) Provisional application No. 60/922,898, filed on Apr. 11, 2007.

(51) Int. Cl.
*B23K 26/20* (2006.01)
*B23K 26/24* (2006.01)
(52) U.S. Cl. .......... 219/121.63; 219/121.73; 219/121.76
(58) Field of Classification Search .......... 219/121.63–121.72, 121.77, 121.61, 219/121.73, 121.76
See application file for complete search history.

(56) References Cited

U.S. PATENT DOCUMENTS

| 2,987,610 | A | 6/1961 | Steigerwald |
|---|---|---|---|
| 3,131,289 | A | 4/1964 | Hansen |
| 3,151,231 | A | 9/1964 | Steigerwald |
| 3,159,419 | A | 12/1964 | Kerby |
| 3,165,619 | A | 1/1965 | Cohen |
| 3,626,140 | A | 12/1971 | Peyrot |
| 3,746,831 | A | 7/1973 | Sciaky |
| 3,778,585 | A * | 12/1973 | Mallozzi et al. ......... 219/121.77 |
| 3,860,784 | A | 1/1975 | Brown et al. |
| 3,881,084 | A | 4/1975 | Baardsen |
| 4,121,087 | A | 10/1978 | Malmuth et al. |
| 4,237,363 | A | 12/1980 | Lemelson |
| 4,251,709 | A | 2/1981 | Schumacher |
| 4,304,979 | A | 12/1981 | Dietrich et al. |
| 4,379,219 | A | 4/1983 | Behrens et al. |
| 4,574,176 | A | 3/1986 | Sharp |
| 4,577,088 | A | 3/1986 | Sharp |
| 4,591,688 | A | 5/1986 | Koch et al. |
| 4,628,179 | A | 12/1986 | Crahay |
| 4,650,954 | A | 3/1987 | Frings et al. |
| 4,656,332 | A | 4/1987 | Gross et al. |

(Continued)

FOREIGN PATENT DOCUMENTS

EP 121 661 A1 1/1984

(Continued)

OTHER PUBLICATIONS

Steigerwald, K, 25 Years of Deep-Penetration Electron Beam Welding, pp. 1-2.

(Continued)

*Primary Examiner* — Samuel M Heinrich
(74) *Attorney, Agent, or Firm* — Ralph E. Smith (57) ABSTRACT

A laser-welding apparatus may include a laser source, an incoming laser beam produced by the laser source, and a beam splitter that splits the incoming laser beam to form a leading beam and a trailing beam. A first focusing lens may focus the leading beam and a second focusing lens may focus the trailing beam to form a trailing-beam pattern on a workpiece. The trailing-beam pattern may include a crescent-shape having arms and a tail portion.

17 Claims, 7 Drawing Sheets

U.S. PATENT DOCUMENTS

| | | | |
|---|---|---|---|
| 4,665,294 A | 5/1987 | Hira et al. | |
| 4,667,080 A | 5/1987 | Jüptner et al. | |
| 4,673,794 A | 6/1987 | Ireie et al. | |
| 4,691,093 A * | 9/1987 | Banas et al. | 219/121.63 |
| 4,737,612 A | 4/1988 | Bruch et al. | |
| 4,751,365 A | 6/1988 | La Rocca et al. | |
| 4,769,522 A | 9/1988 | Lentz et al. | |
| 4,803,334 A | 2/1989 | Burke et al. | |
| 4,827,100 A | 5/1989 | Frings et al. | |
| 4,857,697 A * | 8/1989 | Melville | 219/121.63 |
| 4,899,030 A | 2/1990 | Miyazaki et al. | |
| 4,902,872 A | 2/1990 | Frings et al. | |
| 4,942,285 A | 7/1990 | Ishikawa et al. | |
| 4,945,202 A | 7/1990 | Büdenbender | |
| 4,990,741 A | 2/1991 | Moores et al. | |
| 5,120,926 A | 6/1992 | Marriott | |
| 5,155,323 A | 10/1992 | Macken | |
| 5,183,989 A | 2/1993 | Sanders et al. | |
| 5,245,156 A | 9/1993 | Kamogawa et al. | |
| 5,250,783 A | 10/1993 | Nishi et al. | |
| 5,268,556 A | 12/1993 | Coyle, Jr. et al. | |
| 5,307,369 A * | 4/1994 | Kimberlin | 372/108 |
| 5,347,528 A | 9/1994 | Haruta et al. | |
| 5,410,123 A | 4/1995 | Rancourt | |
| 5,430,816 A | 7/1995 | Furuya et al. | |
| 5,478,983 A | 12/1995 | Rancourt | |
| 5,568,315 A * | 10/1996 | Shuman | 359/485.03 |
| 5,591,359 A | 1/1997 | Saitou et al. | |
| 5,595,670 A * | 1/1997 | Mombo-Caristan | 219/121.64 |
| 5,624,585 A | 4/1997 | Haruta et al. | |
| 5,841,097 A * | 11/1998 | Esaka et al. | 219/121.63 |
| 6,608,278 B1 * | 8/2003 | Xie et al. | 219/121.64 |
| 7,388,172 B2 * | 6/2008 | Sercel et al. | 219/121.72 |
| 7,435,927 B2 * | 10/2008 | Bruland et al. | 219/121.69 |
| 7,693,696 B2 * | 4/2010 | Forrest et al. | 703/7 |
| 2004/0195221 A1 * | 10/2004 | Haglund, Jr. et al. | 219/121.69 |

FOREIGN PATENT DOCUMENTS

| | | |
|---|---|---|
| EP | 233 091 A1 | 8/1987 |
| EP | 229 159 B1 | 4/1991 |
| EP | 0 429 369 A1 | 5/1991 |
| EP | 429 368 A1 | 5/1991 |
| GB | 1 336 806 A | 11/1973 |
| GB | 2 200 067 A | 7/1988 |
| JP | 54-018441 | 2/1979 |
| JP | 54-112352 | 9/1979 |
| JP | 55-094786 | 7/1980 |
| JP | 55-136585 | 10/1980 |
| JP | 57-142781 | 9/1982 |
| JP | 58-125380 | 7/1983 |
| JP | 61-169184 | 7/1986 |
| JP | 61-255773 | 11/1986 |
| JP | 61-255774 | 11/1986 |
| JP | 62216216 A * | 9/1987 |
| JP | 63-252346 | 10/1988 |
| JP | 64-075192 | 3/1989 |
| JP | 03-180286 | 8/1991 |
| JP | 04-210883 | 7/1992 |
| JP | 05-318154 | 12/1993 |
| JP | 06-007984 A | 1/1994 |
| JP | 06170575 A * | 6/1994 |
| JP | 06-182573 | 7/1994 |
| JP | 06-190575 | 7/1994 |
| JP | 06-198472 | 7/1994 |
| JP | 09021981 A * | 1/1997 |
| JP | 09300087 A * | 11/1997 |
| JP | 2005148549 A * | 6/2005 |

OTHER PUBLICATIONS

Elmer et al., Beam Profile Analysis for the S&MS B231 Electron Beam Welding Machines, LLNL, Technical Information Department, Lawrence Livermore National Laboratory, University of California, Jun. 12, 1997, pp. 1-21.

Mazumder, I, Laser-Beam Welding, ASM Handbook, vol. 6; Welding, Brazing and Soldering, Policy of Units of Measure, ASM International, Dec. 1993, pp. 1-18.

Hiramoto et al., Deep Penetration Welding with High Power CO2 Laser, Proceedings of International Conference on Laser Advanced Materials Processing Science and Applications, May 21-23, 1987, pp. 1-7.

Armenskii, E, Drilling Circular Holes With an Elliptical Electron Beam, Physics and Chemistry of materials Treatment, vol. 22, Issue 2, Mar.-Apr. 1988, pp. 116-118.

Xie, J, Dual Beam Laser Welding, Welding Journal, Oct. 2002, pp. 223-S-230-S.

Miyake et al., Experiment on the Focusing of High Power Millimeter-Wave Beam, Transactions of JWRI, vol. 18, No. 2, Welding Research Institute of Osaka University 1989, pp. 169-174.

Haruta et al., High Power Pulse YAG laser Welding of Thin plate, Proceedings of International Conference on Laser Advanced materials Processing, Science and Applications, Jun. 7-12, 1992 pp. 499-505.

Eichorn, F., High Energy Density Welding—Future Research Directions, International Congress on Welding Research, Jul. 13-14, 1984, pp. 169-171.

Anderson, S., Holographic Imaging Aids Automobile Designers, LaserFocus World, Feb. 1999, p. 5.

Quigley, M., Chapter 8 High Power Density Welding, The Physics of Welding, The International Institute of Welding 1984, pp. 268-291.

Albright et al., High-Speed Laser Welding Discontinuities, Journal of Laser Applications, Fall 1988, pp. 18-25.

Mombo-Caristan et al., High Speed High power Laser Blank Cutting and Welding, ICALEO '99, Laser Materials Processing Conference; Proceedings: Nov. 15-18, 1999, pp. 23-21.

Fowler et al., Ignition and Maintenance of Subsonic Plasma Waves in Atmospheric Pressure Air by CW CO2 Laser Radiation and Their Effect on Laser Beam Propagation, Journal of Applied Physics, American Institute of Physics, 1975; 46(1): pp. 138-150.

Mackon et al., Diode-pumped Nd:YAG Laser for Precision Laser Machining, Journal of Laser Applications, Laser Institute of America, Apr. 1996;8, pp. 225-232.

Jones et al., CO2 Laser Welding of Aluminum Alloys, Proceedings of International Conference on Laser Advanced Materials Processing Science and Applications, Jun. 1992, pp. 523-528.

Polk et al., Laser Processing of Materials, United Technologies Research Center, pp. 357-365.

Miller C., Laswer Welding Article, U.S. Laser Corporation, available at http://www.uslaswercorp.com/envoy/welding.html, Sep. 25, 2006, pp. 1-8.

Huntington et al., Laswer Welding of Aluminum and Aluminum Allys, AWS Annual Convention, Apr. 1982, Welding Research Supplement, pp. 105-s-108-s.

Mannik et al., Laswer Welding of Steels: Relationship Between Laser Power, Penetration Depth, Welding Speed and Beam Polarization, ICALEO 1990, pp. 364-373.

Darchuk et al., The Basics of Laser Welding, Lasers & Applications, Mar. 1985, pp. 59-66.

Williams et al., Melt-Pool and Keyhole Dynamics During Thin Plate Laser Welding of Steel, SPIE vol. 1810 Gas Flow and Chemical Lasers, 1992, pp. 594-598.

Swift-Hook et al., Penetration Welding With Lasers, Welding Journal, Nov. 1973, pp. 492-s-499-s.

Forrest et al., Process Development for Dual Beam Laser Welding of Zinc-Coated Steel Sheets in Lap Joint Configuration Without Gap control at the Interface, IIW 2005, International Institute of Welding—Advances in Automotive Joining Technologies Workshop, 2005, pp. 1-10.

Hoffman et al., Process-Optimizing Adaptive Optics for the Beam Delivery of High-Power CO2 Lasers, Proceedings of SPIE—The International Society for Optical Engineering, vol. 1834, Apr. 1993, pp. 195-205.

Forrest et al., Recent Results on Improved Weld Quality for Laser Lap Welding of Zinc-Coated Steel Sheets Without Gap at the Interface, Sheet Metal Welding Conference XI, May 2004, pp. 1-7.

Ducharme et al., The Laser Welding of Thin Metal Sheets: An Integrated Keyhole and Weld Pool Model With Supporting Experiments, J. Phys, D: Appl. Phys. 27, 1994, pp. 1619-1627.

Powers et al., How High-Energy-Density Beam Welding manufactures Transmission Components, Welding Journal, vol. 47, pp. 47-54.

Deutscher Verband für Schweisstechnik, Welding and Cutting by High-Power Lasers Having a Rectangular Beam Cross Section, DVS Beriched No. 99, Beam Technology, Proceedings 2nd International Conference, Germany, pp. 78-80, Fig. 7.

Bergman et al., Laser Material Processing With 18kW Using a Variable Beam Profile Achieved With a Deformable Optic, University Erlangen-Nürnberg, Germany, pp. 363-369.

Weldingh et al., Very Deep Penetration Laser Welding Techniques and Limitations, 8th NOLAMP Conference, 2001, pp. 1-10.

Parker et al., Industrial Lasers and Their Applications, Chapter 12, pp. 217-231, Prentice Hall, Inc., 1985.

Kuvin B., Laser and Electron Beams for Deep, Fast Welding, Welding Design & Fabrication, Aug. 1985, pp. 34-40.

Kielwasser et al., Physical Process During Pulsed ND: YAG Laser and CW-CO2 Laser Welding of Zinc Coated Steel, Laser Apps. Auto Industry—ICALEO 2000, pp. A10-A21.

Banas C., High Power Laser Welding, The Industrial Laser Annual Handbook 1986 Edition, SPIE vol. 629, pp. 65-375.

Aruga et al., Efficient and High-Quality Overlap Welding of Car-Body Aluminum Alloy Metal Sheets With High Power Nd:YAG Laser by Flexible Fiber Beam Delivery, Proceedings of International Conference on Laser Advanced Materials Processing Science and Applications: Jun. 1992, Osaka japan, pp. 517-522.

Bagger et al., Process Behaviour During High Power CO2 Laser Welding of Zinc Coated Steel, Proceedings of international Conference on Laser Advanced Materials Processing Science and Applications, Jun. 1992, Osaka Japan, pp. 553-557.

Dawes C., Laser Welding of Sheet Metal Fabrications—Process Improvements, Laser Welding, Machining, and Materials Processing: Proceedings of the International Congress on Applications of Lasers and Electro Optics, ICALEO Nov. 1985, pp. 73-80.

Dawes et al., Laser Welding of Deep Drawing Steel Sheet and Microalloyed Steel Plate, Second International Congress on Applications of Lasers and Electro Optics, Nov. 1983, pp. 73-79.

Haferkamp et al., Laser Beam Welding of HSS-Components for Car-Bodies, Proceedings: 25th ISATA Silver Jubilee International Symposium on Automotive Technology and Automation 1992, Osaka, Japan, pp. 173-179.

Katayama et al., Pulse Shape Optimization for Defect prevention in Pulsed Laser Welding of Stainless Steels, ICALEO 1993: Laser Materials Processing: proceedings: Oct. 1993, pp. 487-497.

Kimura et al., Welding Properties With High Power Pulsed CO2 Laser, Proceedings of International Conference on Laser Advanced Materials Processing Science and Applications, May 1987, Osaka, Japan, pp. 169-174.

Kymal C., Laser Welding in High Production, Second International Congress on Applications of Lasers and Electro-Optics, Nov. 1983, vol. 38, pp. 90-96.

Minamida et al., Butt Welding of Thin Stainless Steel Sheets With the 'Rippled Mode' Nd-YAG Laser, ICALEO '91: laser Materials Processing: Nov. 1991, pp. 168-177.

Mombo-Caristan et al., Seam Geometry Monitoring for Tailored Welded Blanks, ICALEO '91: Laser Materials Processing, Nov. 1991, pp. 123-132.

Shinmi et al., Laser Welding and Its Applications for Steel Making Process, Laser Welding, machining, and materials processing: proceedings of the International Congress on Applications of Lasers and Electro-Optics, ICALEO Nov. 1985, pp. 65-72.

Ross et al., Advances in Laser Welding of Automotive Parts, Proceedings: 25th ISATA Silver Jubilee International Symposium on Automotive Technology and Automation, Jun. 1992, pp. 165-171.

Sharp C., Development and Implementation of High Speed Laser Welding in the Can Making Industry, Proceedings of International Conference on Laser Advanced materials Processing Science and Applications, May 1987, pp. 541-547.

Llewellyn S., Laser Welding of High-Speed Roll-Formed Products, Lasers in Manufacturing: Proceedings of the 4th International Conference, May 1987, IFS (Publications) Ltd, Bedford, UK, pp. 297-301.

* cited by examiner

LASER-WELDING APPARATUS AND METHOD

CROSS-REFERENCE TO RELATED APPLICATIONS

This application claims the benefit of Provisional Patent Application No. 60/922,898 filed Apr. 11, 2007.

FIELD

The present disclosure relates to laser welding and more particularly to a dual-beam laser-welding apparatus and a method.

BACKGROUND

The statements in this section merely provide background information related to the present disclosure and may not constitute prior art.

Conventional laser welding has been used in various industries to join metallic components such as, for example, steel sheets used in manufacturing automotive body panels and the like. Such steel sheets are typically galvanized or galvannealed by treating the steel sheet with a protective coating such as, for example, zinc.

While protective coatings inhibit rust formation and corrosion, such coatings increase the complexity of welding treated steel plates. Conventional coating materials used to treat steel sheets typically include a boiling temperature that is different than a melting temperature of the steel from which the steel sheets are formed. The discrepancy in boiling/melting temperature between the coating material and the steel may cause the protective coating to boil and infiltrate the pool of molten metal when two or more treated steel plates are welded in an overlap configuration. Such infiltration of the protective coating vapor into the weld pool may cause the weld pool to spatter and/or become porous. The spattering and porosity of the weld results in a weakened weld that is prone to corrosion.

SUMMARY

A laser-welding apparatus may include a laser source, an incoming laser beam produced by the laser source, and a beam splitter that splits the incoming laser beam to form a leading beam and a trailing beam. A first focusing lens may focus the leading beam and a second focusing lens may focus the trailing beam to form a trailing-beam pattern on a workpiece. The trailing-beam pattern may include a crescent-shape: having arms and a tail portion.

In another form, an optical system for a dual-beam laser-welding apparatus may include an incoming beam, a beam splitting mirror having a reflective surface, and an aperture. The aperture may allow a first portion of the incoming beam to pass through the beam splitting mirror while the reflective surface reflects a second portion of the incoming beam. A first focusing lens may focus the first portion of the incoming beam to form a circular leading-beam pattern on a workpiece and a second focusing lens may focus the second portion of the incoming beam to form a first trailing-beam pattern or the workpiece. The first trailing beam may be crescent-shaped and may include arms and a tail. The beam splitting mirror may be adjustable relative to the incoming beam to adjust a length of the tail of the trailing-beam pattern according to a predetermined material property of the workpiece.

A method of laser welding may include providing an incoming laser beam, splitting the incoming laser beam to form a leading beam and a trailing beam, and focusing the leading beam and the trailing beam. The method may further include arranging a workpiece between a focusing element and a focal point of the trailing beam to form a crescent-shaped trailing-beam pattern and a leading-beam pattern on the workpiece. A beam splitter may move relative to the incoming laser beam to manipulate the trailing-beam pattern according to a predetermined material property of the workpiece.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
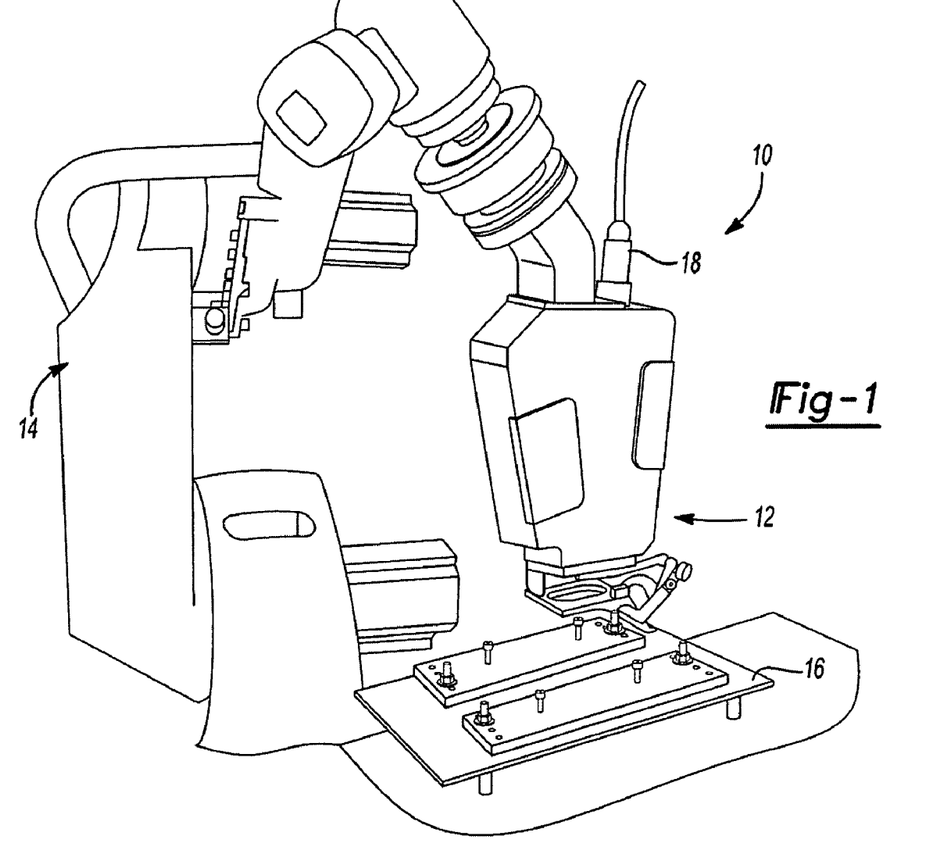
FIG. 1 is a perspective view of a dual-beam laser-welding apparatus according to the principles of the present disclosure.
Figure 2:
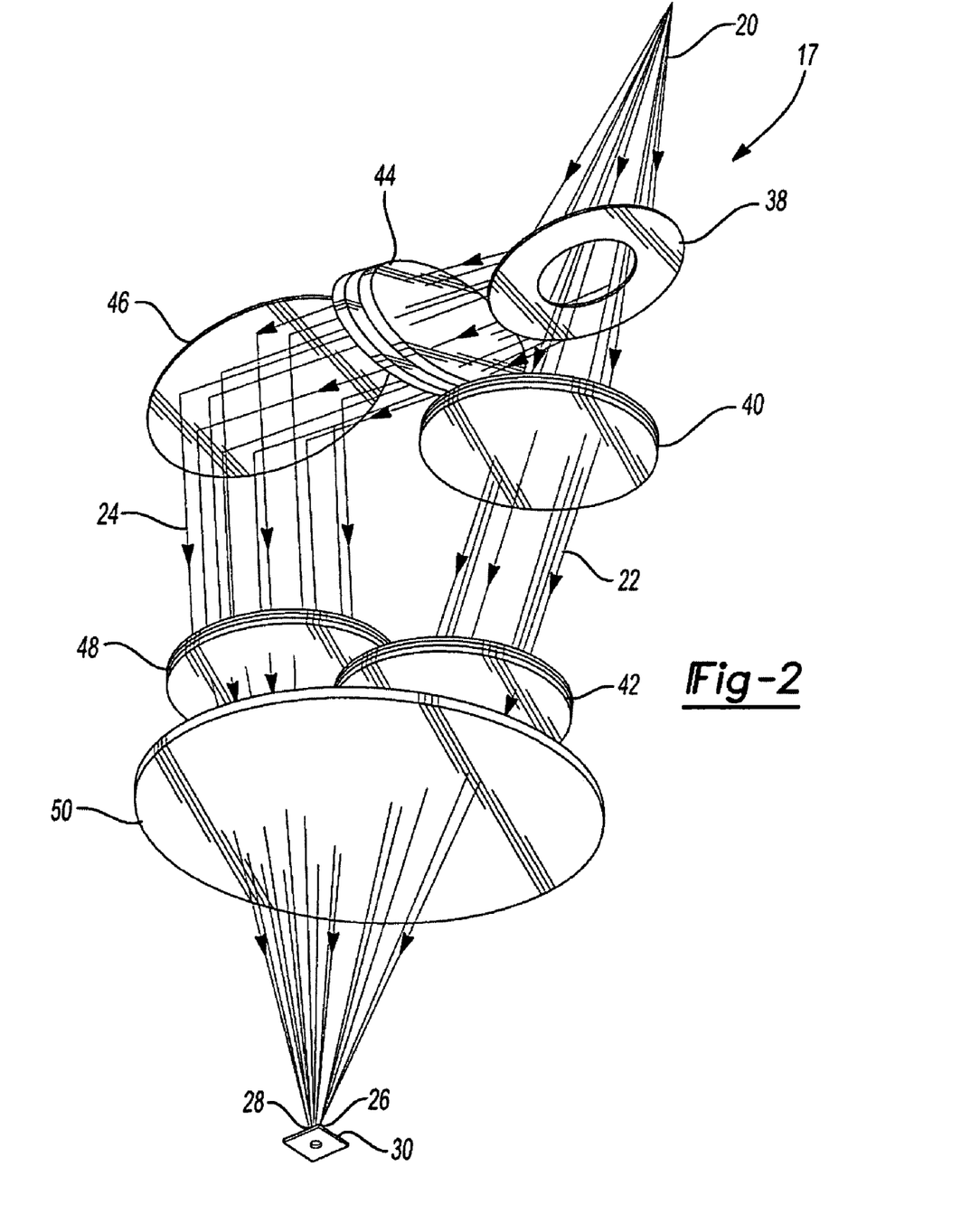
FIG. 2 is a schematic perspective view of an optical system of the dual-beam laser-welding apparatus of FIG. 1.
Figure 3:
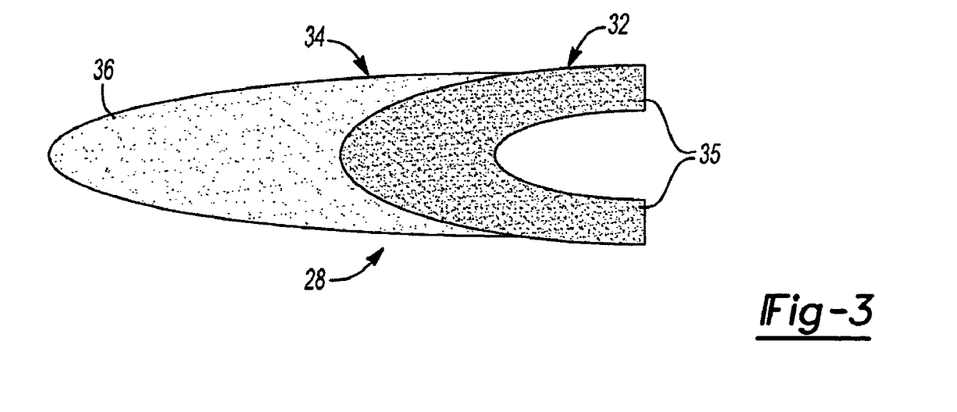
FIG. 3 is schematic illustration of a trailing-beam pattern according to the principles of the present disclosure.

With reference to FIGS. 1-3, a dual-beam laser-welding apparatus 10 is provided and includes a laser head 12 that may be movable through a plurality of positions by a machine such as a robot 14. The laser head 12 may be movable by the robot 14 relative to a substrate stage 16 in x-, y-, and z-axis directions. Further, the robot 14 may be capable of rotating the laser head 12 about the z-axis through 360°, as well as rotating the laser head 12 through a plurality of points relative to the x- and y-axes. In this manner, the laser head 12 may be movable through a locus of points that is substantially hemispherical. The substrate stage 16 may also be movable through a plurality of positions (i.e., in the x-, y-, and x-axis directions) relative to the laser head 12, as well as angularly movable relative to the laser head 12. Further, other devices may be capable of moving the laser head 12 such as, for example, a gantry or any other motion system known in the art.

The laser head 12 may include an optical system 17 and a laser source 18 capable of projecting an incoming laser beam 20. As will be subsequently described, the optical system 17 may split an incoming laser beam 20 at least once to form a leading beam 22 and a trailing beam 24. The optical system 17 causes the leading beam 22 and the trailing beam 24 to form a leading-beam pattern 26 and a trailing-beam pattern 28, respectively, on an individual substrate or workpiece 30 or on a plurality of workpieces.

The leading beam 22 and the trailing beam 24 may cooperate to form a keyhole in the workpiece 30 (neither shown), whereby the leading beam 22 opens the keyhole in the workpiece 30 (or workpieces) and the trailing beam 24 expands and controls the shape of the keyhole. Controlling the shape and orientation of the keyhole dictates the robustness of the welding process and, therefore, the overall quality of the weld. The dual-beam laser-welding apparatus 10 may be of the type disclosed in Assignee's commonly owned patent applications; Ser. No. 11/423,230 (filed Jun. 9, 2006) and Ser. No. 11/469,961 (filed Sep. 5, 2006), the disclosures of which are incorporated herein by reference.

Referring now to FIGS. 2-15, the trailing beam pattern 28 may include a generally horseshoe or crescent-shape for laser-lap joining zinc coated steels without use of interfacial gap control while the leading-beam pattern 22 may be generally circular. As shown in FIG. 3, the trailing-beam pattern 28 may be artificially divided into two parts; an arm portion 32 and a tail portion 34. The arm portion 32 may include a plurality of arms 35 connected by the tail portion 34.

The dimensions of the arm portion 32 may be about 1 mm long by about 1 mm wide, for example. The tail portion 34 may be about 1 mm wide by about 1-5 mm long, for example. The foregoing dimensions may be sufficient for most automotive body welding applications (i.e., for a total sheet stackup thickness substantially between 1 mm and 5 mm, for example), however, the dimensions of the arm portion 32 and the tail portion 34 may vary depending on the application and the materials to be welded.

Use of a horseshoe or crescent-shaped trailing-beam pattern 28 eliminates a cusp shaped keyhole, which is the byproduct of using two laser beams having a generally circular shape. The cusp shape maybe generated in a keyhole side wall of a substrate at the location where the two laser beams merge. Such cusp features are not a desired feature for a keyhole, as such cusp features may create a turbulent flow around the keyhole and cause spattering. The two forwardly extending arms 35 of the horseshoe-shaped trailing-beam pattern 28 can smooth out the "cusp" feature and, as such, lead to a more stable keyhole and good weld quality.

Referring now to FIG. 3, the tail portion 34 of the trailing-beam pattern 28 may extend in a direction generally away from the leading-laser beam. An extended portion 36 of the horseshoe- or crescent-shaped trailing-beam pattern 28 is shown cross-hatched in FIG. 3 to illustrate an extended tail portion 34. Utilizing such an extended tail portion 34 slows down a solidification rate of a weld pool and therefore improves the overall weld quality. Furthermore, in addition to eliminating defects in the weld pool, the extended tail portion 34 favors a stable keyhole due to more liquid metal being present.

While the extended tail portion 34 improves weld quality, it also requires consumption of additional energy. Such additional energy consumption is directly related to the overall length of the tail portion 34 and the energy consumed by the trailing beam 24. Increasing the power consumed by the trailing beam 24 reduces the power available to the leading beam 22. Therefore, adjustments to the laser-welding apparatus 10 may be required to properly distribute power between the leading beam 22 and the trailing beam 24. For example, distributing power between the leading beam 22 and the trailing beam 24 may depend on a desired cooling rate and/or properties of the material to be welded such as, for example, the melting point, the coefficient of thermal conductivity, and the coefficient of thermal expansion.

Referring now to FIG. 2, the optical system 17 of the laser head 12 is provided. The optical system 17 may include a beam splitter 38, a leading beam collimating lens 40, a leading beam focusing lens 42, a trailing beam collimating lens 44, a reflecting mirror 46, one or more trailing beam focusing lenses 48, and a laser head cove ring glass 50.

The beam splitter 38 may be a copper mirror having an aperture 52 disposed therethrough. The beam splitter is arranged relative to the laser source 18 such that a first portion of the incoming beam 20 passes through the aperture 52 forming the leading beam 22, while a second portion of the incoming beam 20 is reflected off of the beam splitter to form the trailing beam 24.

After passing through the aperture 52, the leading beam 22 passes through the leading beam collimating lens 40. The leading beam collimating lens 40 is configured to collimate the leading beam 22, which subsequently passes through the leading beam focusing lens 42 and forms a round spot on the workpiece 30. The leading beam focusing lens 42 is configured such that a virtual focal point of the leading beam 22 is located below the surface of the workpiece 30 (i.e., the surface of the workpiece 30 is disposed between the leading beam focusing lens 42 and the virtual focal point of the leading beam 22), thereby forming the generally circular leading-beam pattern 26 on the workpiece 30.

After reflecting off of the beam splitter 38, the trailing beam 24 passes through the trailing beam collimating lens 44 configured to collimate the trailing beam 24. The collimated trailing beam 24 is subsequently reflected off of the reflecting mirror 46 and subsequently passes through the trailing beam focusing lenses 48. The trailing beam focusing lenses 48 are configured such that a virtual focal point of the trailing beam 22 is located below the surface of the workpiece 30 (i.e., the surface of the workpiece 30 is disposed between the trailing beam focusing lenses 48 and the virtual focal point of the trailing beam 24), thereby forming the horseshoe or crescent-shaped trailing-beam pattern 28 on the workpiece 30. The horseshoe or crescent-shaped trailing-beam pattern 28 is the image of the portion of the beam splitter 38 off of which the incoming beam 20 reflects. The trailing beam focusing lenses 48 are configured to control the length and width of the trailing-beam pattern 28.

Figure 4:
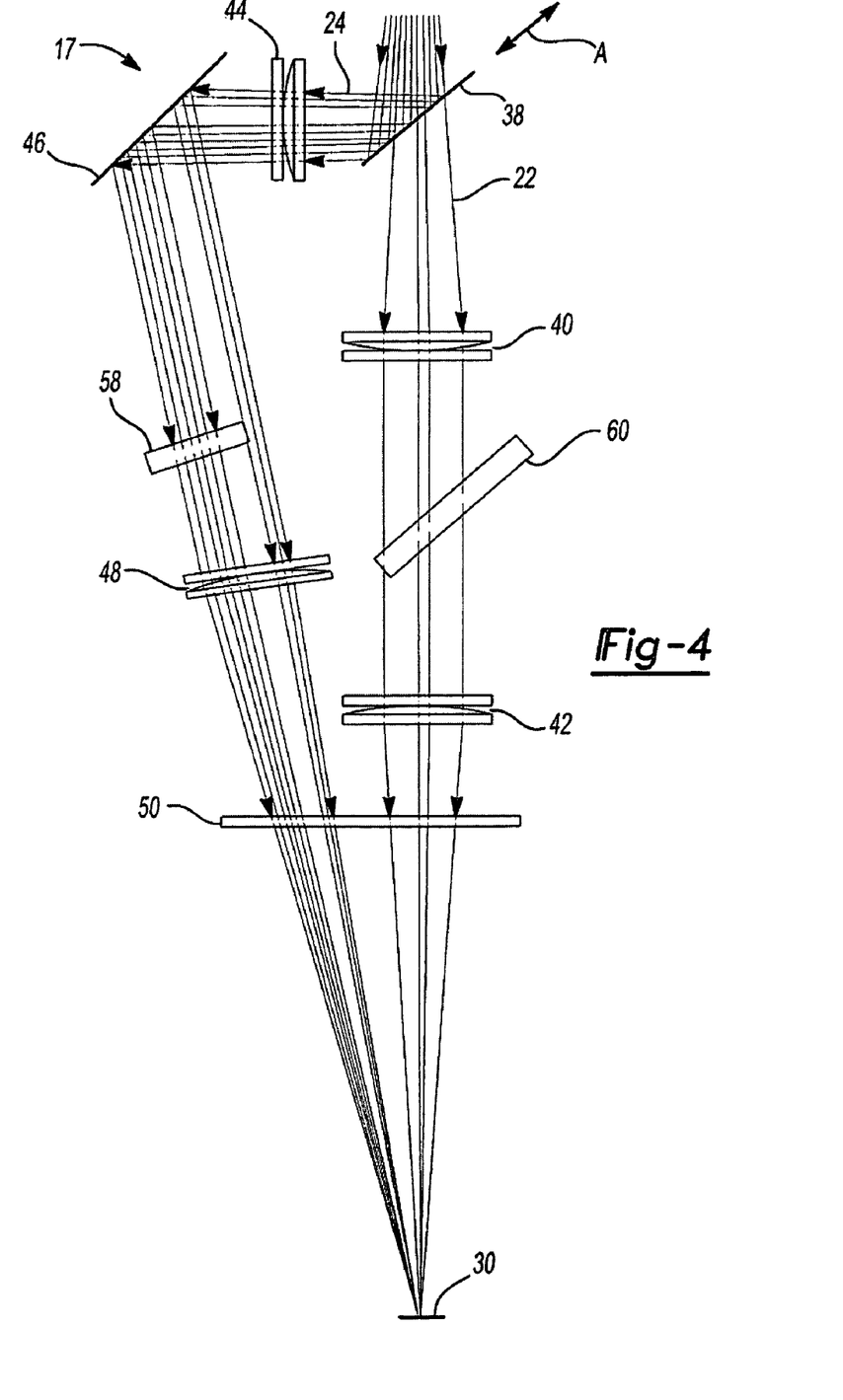
FIG. 4 is a schematic side view of an optical system according to the principles of the present disclosure.

Referring now to FIGS. 2-15, the optical system 17 may include additional optical elements, modifications, and/or features when compared to the system of FIG. 2 that permit the optical system 17 of FIG. 4, for example, to produce a trailing-beam pattern 28 having an extended tail portion 34 (FIG. 2).

Figure 5:
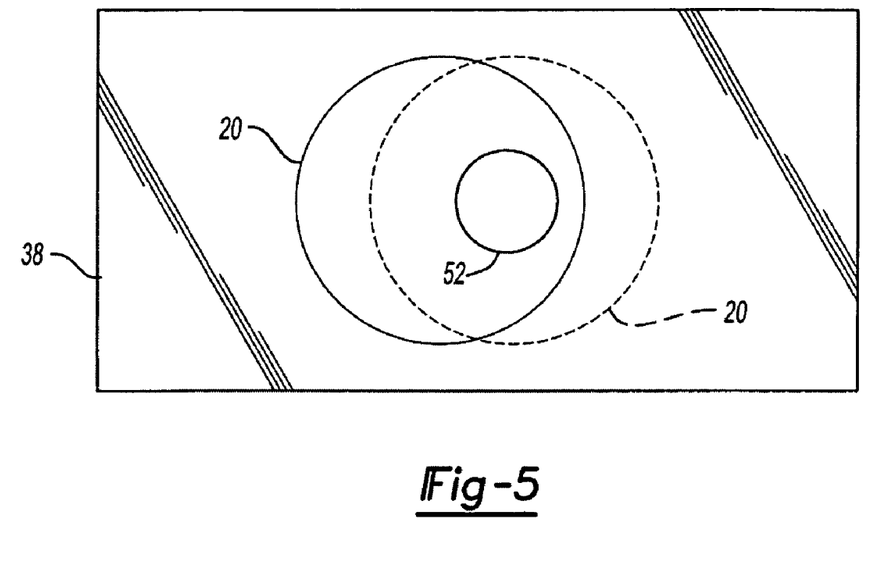
FIG. 5 is a schematic illustration of a beam splitter and a range of incoming beam positions according to the principles of the present disclosure.

As described above, the copper mirror beam splitter 38 includes the aperture 52 located at or near a center portion of the mirror, which is coaxial with a longitudinal axis of the incoming beam 20. FIG. 5 illustrates a range of positions (shown in solid and dashed lines) in which the center of the incoming beam 20 may be positioned relative to the aperture 52 of the beam splitter 38. For example, the aperture 52 can be offset from an incoming raw beam center (represented by the solid line type) to form the horseshoe or crescent-shaped trailing-beam pattern 28 with smaller arms 35 (FIG. 7).

Figure 6:
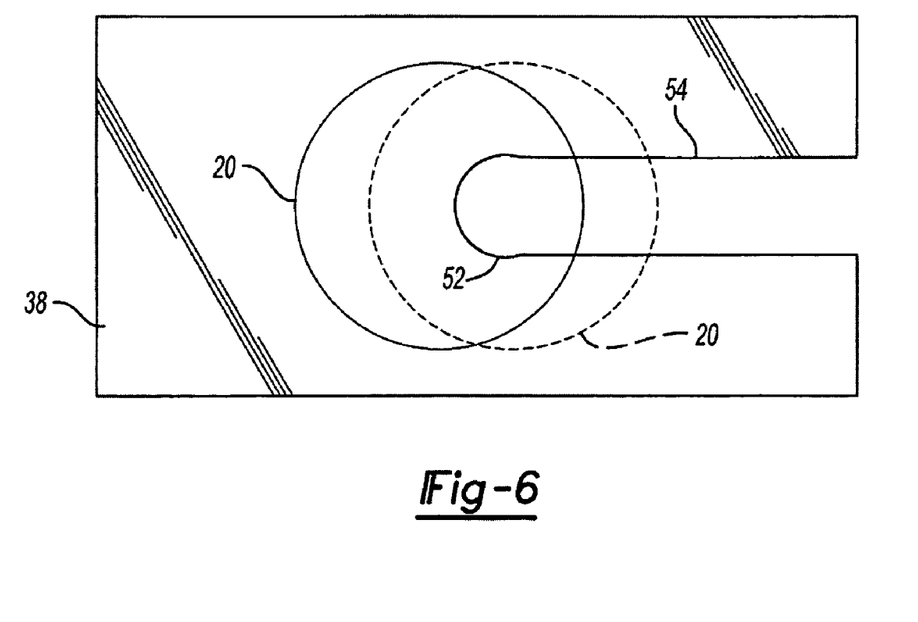
FIG. 6 is a schematic illustration of a beam splitter having a slotted aperture and a range of incoming beam positions according to the principles of the present disclosure.

In order to make the arm and tail length of the trailing beam 24 continuously adjustable, the aperture 52 may be in the form of a slot 54 of a predetermined length. The slot 54 may be machined from a center of the beam splitter to a front edge thereof, as shown in FIG. 6. The beam splitter 38 may also be designed to be slidably adjustable within a plane along arrow A (FIG. 4) to provide adjustability of both: (1) the leading to trailing beam power ratio and (2) the tail length of the horseshoe or crescent-shaped trailing-beam pattern 28.

Figure 7:
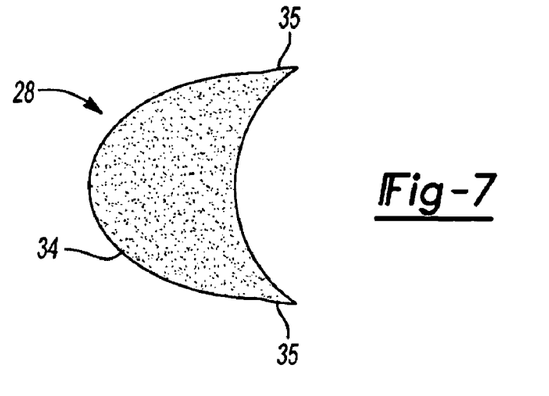
FIG. 7 is a schematic illustration of a trailing-beam pattern having a shortened tail portion and a shortened arm portion.
Figure 8:
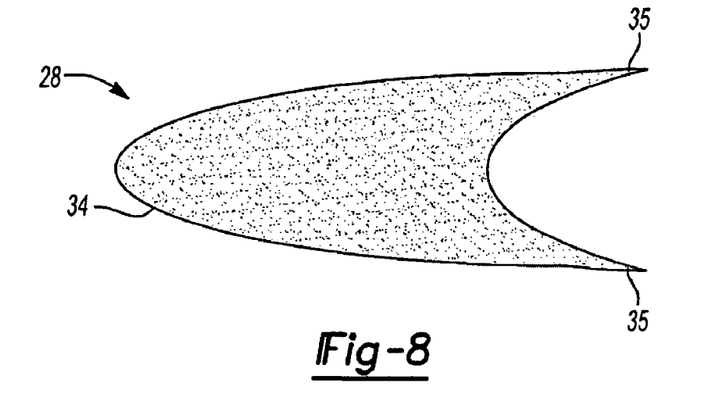
FIG. 8 is a schematic illustration of a trailing-beam pattern having an extended tail portion and an extended arm portion.

With reference to FIGS. 7 and 8, the trailing-beam pattern 28 is provided to illustrate the effects of sliding the beam splitter 38. For example, sliding the beam splitter 38 to a first position (corresponding to a position of the solid circle in FIG. 6) results in the slot 54 being offset, thereby creating the resulting trailing-beam pattern 28 illustrated in FIG. 7. The resulting trailing-beam pattern 28 of FIG. 7 includes a generally horseshoe or crescent shape with "short" arms 35. The trailing-beam pattern 28 can be elongated in a welding direction (FIG. 8) by adjusting the trailing beam focusing lenses 48 between the reflecting mirror 46 and the workpiece 30 (e.g., FIGS. 2 and 4).

Figure 9:
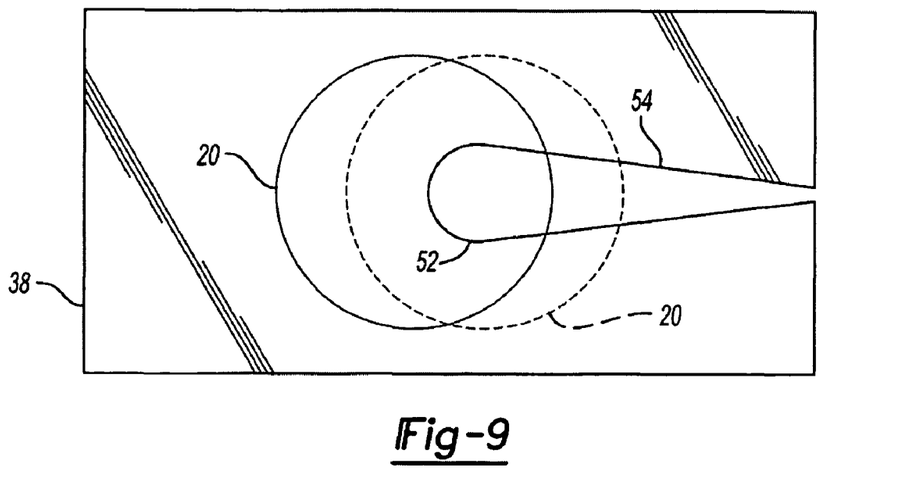
FIG. 9 is a schematic illustration of a beam splitter having an aperture with a tapered slot and a range of incoming beam positions according to the principles of the present disclosure.
Figure 10:
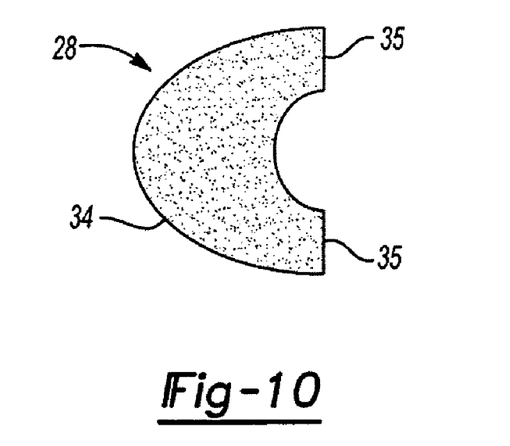
FIG. 10 is a schematic illustration of a trailing-beam pattern created using the beam splitter of FIG. 9.
Figure 11:
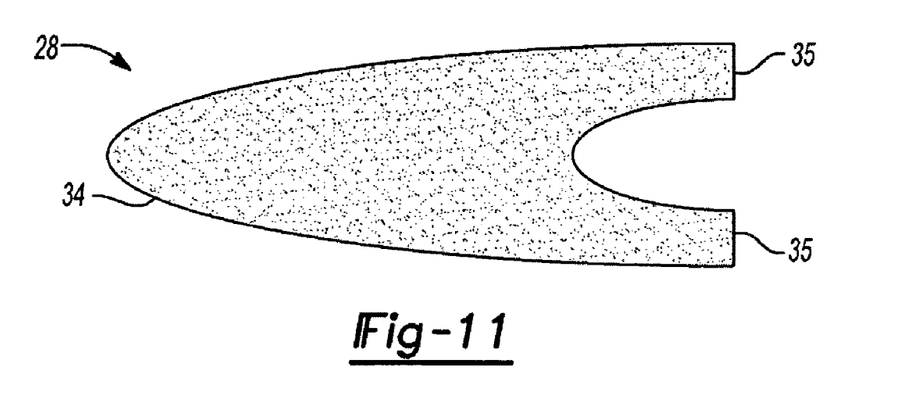
FIG. 11 is a schematic illustration of a trailing-beam pattern including an extended tail portion and an extended arm portion created using the beam splitter of FIG. 9.

The slot 54 of the beam splitter 38 could also include a shape having a taper extending towards a front edge of the beam splitter 38 (FIG. 9). Such a slot configuration will provide more light to the arms 35 of the horseshoe or crescent shaped trailing-beam pattern 28, thereby thickening the arms 35 (FIGS. 10 and 11) relative to the arms 35 shown in FIGS. 7 and 8.

Figure 12:
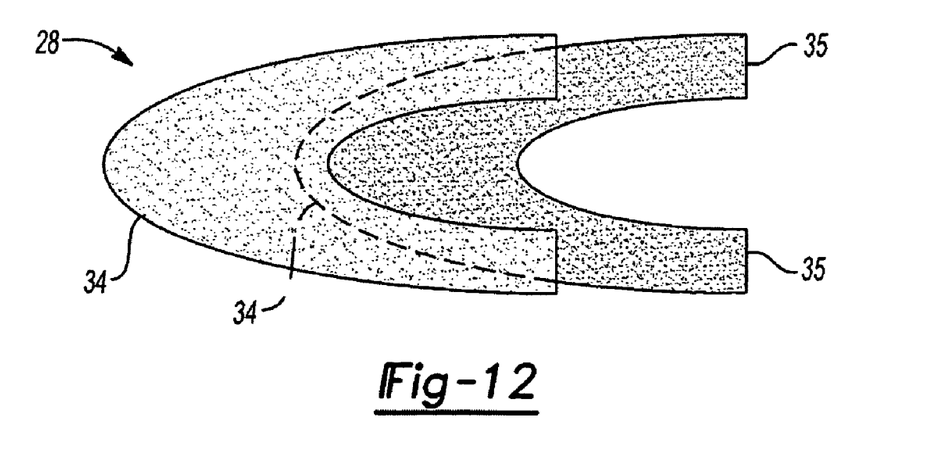
FIG. 12 is a schematic illustration of a beam pattern of a split trailing beam according to the principles of the present disclosure.
Figure 13:
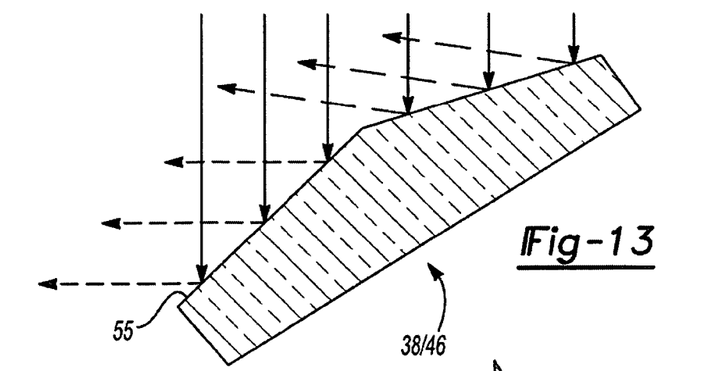
FIG. 13 is a schematic side view of a roof top reflective surface of the beam splitter and/or a reflecting mirror according to the principles of the present disclosure.

In addition to the foregoing, the tail portion 34 of the trailing-beam pattern 28 may be lengthened by splitting the trailing beam 24 into two or more beams and overlaying these beams in an appropriate manner, as shown in FIG. 12. For example, splitting the single trailing beam 24 may be accomplished by modifying the beam splitter 38 and/or reflecting mirror 46 surface profiles to make each of the beam splitter 38 and/or reflecting mirror 46 surfaces contain two or more fades to become a roof top mirror (FIG. 13). While FIG. 13 only shows a convex surface profile, a concave profile could alternatively be used.

Figure 14:
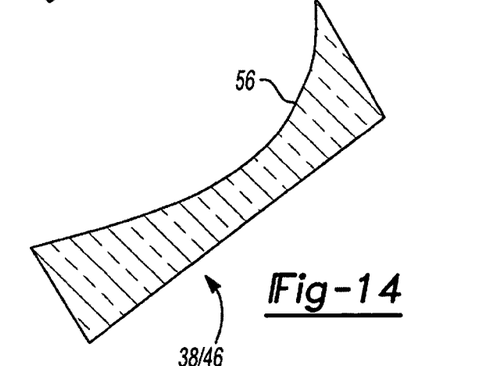
FIG. 14 is a schematic side view of a parabolic reflective surface of the beam splitter and/or reflecting mirror according to the principles of the present disclosure.
Figure 15:
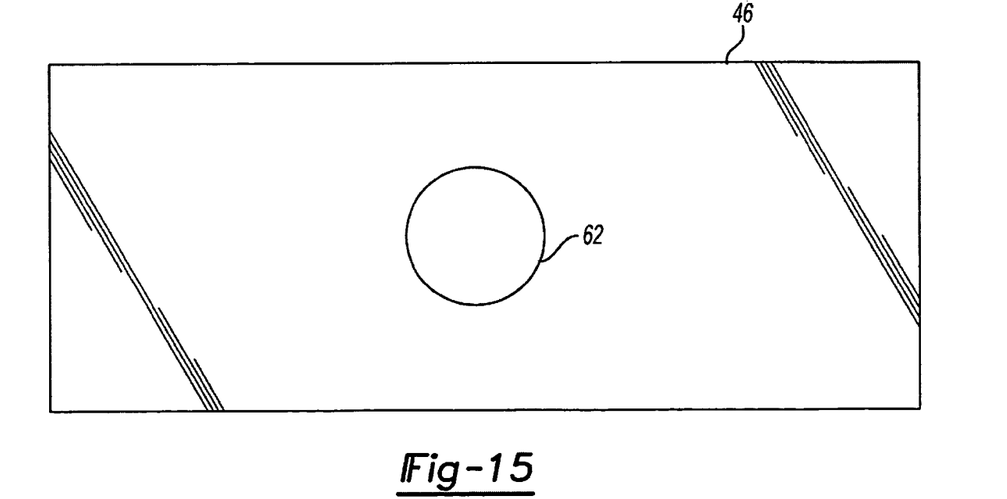
FIG. 15 is a schematic illustration of a reflecting mirror having an aperture according to the principles of the present disclosure.

An infinite number of faces including an infinitely small face width (area) may be machined onto the mirror surface, thereby causing the mirror to become parabolic. FIG. 14 shows a concave parabolic surface profile 56 that could be formed on the beam splitter 38 and/or the reflecting mirror 46. By controlling the curvature of the parabolic surface profile 56, the resulting trailing-beam pattern 28 can be elongated more in an intended stretching direction than in other directions. While, the parabolic surface profile 56 is shown in FIG. 14 as being concave, the beam splitter 38 and/or reflecting mirror 46 could have a convex parabolic surface profile.

The trailing beam 24 may also be split into two parts by including a bifocal lens 58 between the reflecting mirror 46 and the trailing beam focusing lenses 48 (FIG. 4) on the trailing beam optical path. The bifocal lens 58 may only clip a portion of the trailing beam 24 and focus the clipped portion at a desired location to stretch the tail portion 34 of the trailing beam 24. Furthermore, it may also be possible to split one of the trailing beam focusing lenses 48, thereby adjusting the distance of each half lens to the rest of the trailing beam focusing lenses 48 to only lengthen a rear portion of the trailing beam 24 (i.e., to create the extended tail portion 34 shown in FIGS. 3, 8, and 11).

Splitting the trailing beam 24 into two or more beams may also be accomplished by inserting at least one partially transparent lens 60 below the beam splitter 38 in the optical path of the leading beam 22 (FIG. 4). A first portion of the leading beam 22 may transmit through the partially transparent lens 60 while a second portion of the leading beam 22 may be reflected to the reflecting mirror 46. There may be an aperture 62 machined through the reflecting mirror 46 (FIG. 15), and another mirror may be mounted therein. By adjusting the orientation of this inserted small mirror, the portion of the leading beam 22 that is reflected from the partial transparent lens 60 can be ultimately deployed to the desired location and achieve its purpose, such as supplementing the trailing-beam pattern 28 or the leading-beam pattern 26, for example.

The aperture 62 in the reflecting mirror 46 (FIG. 15) can also be used to introduce an additional laser beam from outside of the laser head 12. This laser beam can be from another laser source (not shown) or from the laser source 18 and can be directed through the aperture 62 toward the workpiece 30. By pointing this laser beam at the desired position at the workpiece 30, the trailing-beam pattern 28 shown in FIG. 3 can be achieved. Other focusing lenses or cylindrical lenses may be needed to facilitate this result.

The dual-beam welding apparatus 10 provides a stable keyhole that prevents spattering and produces high quality welds for a variety of coated and uncoated materials such as, for example, aluminum, magnesium, steel, other metals, and alloys thereof. The adjustability of the tail length of the trailing-beam pattern 28 provides for control of the weld cooling rate, which is critical for many materials.

Welding with conventional apparatus and methods often causes solidification porosity in the workpiece due to high coefficients of thermal conductivity common amongst many metals. The dual-beam welding apparatus 10 and the methods described herein reduce solidification rates of the molten metal, thereby reducing solidification porosity in the workpiece.

Any or all of the means and/or methods described herein may be combined or implemented separately to achieve the desired trailing-beam pattern 28. Further, the description of the present disclosure is merely exemplary in nature and, thus, variations that do not depart from the gist of the disclosure are intended to be within the scope of the disclosure. Such variations are not to be regarded as a departure from the spirit and scope of the disclosure.

What is claimed is:

1. A laser-welding apparatus comprising:
   a laser source;
   an incoming laser beam produced by said laser source;
   a beam splitter adapted to split said incoming laser beam to form a leading beam and a trailing beam;
   a first focusing lens adapted to focus said leading beam; and
   a second focusing lens adapted to focus said trailing beam to form a trailing-beam pattern on a workpiece;

wherein said leading-beam is formed by passing a portion of said incoming laser beam through an aperture of said beam splitter and said trailing beam is formed by reflecting a portion of said incoming laser beam off of said beam splitter from an area adjacent to said aperture to provide said trailing-beam pattern with a crescent-shape having arms and a tail portion.

2. The laser-welding apparatus according to claim 1, wherein said beam splitter is adjustable relative to said incoming laser beam to customize a shape of said trailing-beam pattern.

3. The laser-welding apparatus according to claim 1, wherein longitudinal axis of said incoming laser beam is coaxial with said aperture of said beam splitter.

4. The laser-welding apparatus according to claim 1, wherein a center of said aperture is offset from a longitudinal axis extending along a center of said incoming laser beam.

5. The laser-welding apparatus according to claim 1, further comprising a device for splitting at least one of said leading beam and said trailing beam.

6. The laser-welding apparatus according to claim 1, wherein said beam splitter includes a roof top optical surface.

7. The laser-welding apparatus according to claim 1, further comprising a bifocal lens disposed in an optical path of said trailing beam between said beam splitter and said second focusing lens, said bifocal lens being adapted to split said trailing beam.

8. The laser-welding apparatus according to claim 1, further comprising a reflecting mirror redirecting said trailing beam from said beam splitter to said second focusing lens.

9. The laser-welding apparatus according to claim 1, wherein said beam splitter is a copper mirror.

10. The laser-welding apparatus according to claim 1, wherein said incoming laser beam is offset from said aperture.

11. The laser-welding apparatus according to claim 1, wherein a position of said incoming laser beam relative to said aperture determines the shape of said trailing-beam pattern.

12. The laser-welding apparatus according to claim 1, wherein said aperture determines the shape of said trailing-beam pattern.

13. The laser-welding apparatus according to claim 1, wherein said aperture is circular.

14. The laser-welding apparatus according to claim 1, wherein said aperture includes a slot.

15. The laser-welding apparatus according to claim 1, wherein said aperture includes a slot extending into said beam splitter and terminating at an arcuate end.

16. The laser-welding apparatus according to claim 1, wherein said aperture includes a slot having an arcuate end.

17. The laser-welding apparatus according to claim 1, wherein said leading beam includes a circular shape.

* * * * *